(12) United States Patent
Barbou et al.

(10) Patent No.: US 9,304,020 B2
(45) Date of Patent: Apr. 5, 2016

(54) DEVICE FOR MAINTAINING AND ANALYZING AN AERODYNAMIC PROBE

(75) Inventors: Jean-Jacques Barbou, La Ferte Beauharnais (FR); Jacques Mandle, Saint Peray (FR)

(73) Assignee: THALES, Courbevoie (FR)

( * ) Notice: Subject to any disclaimer, the term of this patent is extended or adjusted under 35 U.S.C. 154(b) by 99 days.

(21) Appl. No.: 14/008,768

(22) PCT Filed: Mar. 21, 2012

(86) PCT No.: PCT/EP2012/054930
§ 371 (c)(1),
(2), (4) Date: Sep. 30, 2013

(87) PCT Pub. No.: WO2012/130669
PCT Pub. Date: Oct. 4, 2012

(65) Prior Publication Data
US 2014/0020479 A1    Jan. 23, 2014

(30) Foreign Application Priority Data
Mar. 31, 2011    (FR) ...................................... 11/00955

(51) Int. Cl.
*G01P 5/165* (2006.01)
*G01F 1/46* (2006.01)
*G01P 5/16* (2006.01)

(52) U.S. Cl.
CPC ... *G01F 1/46* (2013.01); *G01P 5/16* (2013.01); *G01P 5/165* (2013.01)

(58) Field of Classification Search
None
See application file for complete search history.

(56) References Cited

U.S. PATENT DOCUMENTS

| 3,926,594 | A | | 12/1975 | Seib et al. |
| 4,645,517 | A | | 2/1987 | Hagen et al. |
| 5,054,312 | A | * | 10/1991 | Wilson, II ...................... 73/49.2 |
| 5,257,536 | A | | 11/1993 | Beigbeder et al. |
| 2004/0093953 | A1 | | 5/2004 | Gilkison et al. |

FOREIGN PATENT DOCUMENTS

FR    2665539 A1    2/1992

* cited by examiner

Primary Examiner — Harshad R Patel
(74) Attorney, Agent, or Firm — Baker & Hostetler LLP

(57) ABSTRACT

A device for maintaining and analyzing an aerodynamic probe of stagnation pressure type intended to be installed in an aircraft comprises a channel with a first end that is intended to penetrate into the probe, and an ejector fluidly coupled to the channel to create an air depression in said channel relative to the ambient pressure and a closed vessel recovering any particles sucked into the channel, the ejector and closed vessel being external to the probe when the channel is inserted into the probe. The ejector is coupled to a pressurized gas source and ejects gas in proximity to a second end of the channel opposite the first end to suction the air present in the channel and thereby create the air depression in said channel.

11 Claims, 2 Drawing Sheets

DEVICE FOR MAINTAINING AND ANALYZING AN AERODYNAMIC PROBE

CROSS-REFERENCE TO RELATED APPLICATIONS

This application is a National Stage of International patent application PCT/EP2012/054930, filed on Mar. 21, 2012, which claims priority to foreign French patent application No. FR 1100955, filed on Mar. 31, 2011, the disclosures of which are incorporated by reference in their entirety.

FIELD OF THE INVENTION

The invention relates to a device for maintaining and analyzing an aerodynamic probe.

BACKGROUND

The piloting of any aircraft requires the knowledge of its relative speed in relation to the air, that is to say to the relative wind. This speed is determined using sensors sensing the static pressure Ps, the total pressure Pt, the angle of attack α and the sideslip angle β. α and β give the direction of the speed vector in a reference system, or reference base, linked to the aircraft and Pt-Ps gives information linked to the modulus of this speed vector. In fact Pt-Ps gives so-called conventional airspeed information, critical for piloting, because it indicates whether or not the aircraft is present in a safe flight domain. The four aerodynamic parameters therefore make it possible to determine the speed vector of an airplane and, incidentally, of an aircraft with rotor, called helicopter, and with tilting rotor, called convertible.

The measurement of the total pressure Pt is usually done by measuring the stagnation pressure of the flow using a so-called Pitot tube. This is a tube that is open at one of its ends, and blocked at the other. The open end of the tube substantially faces the flow.

Inside the Pitot tube, close to the blocked end, there is an orifice connected to a means for measuring the air pressure prevailing therein. The thread of air penetrating into the tube through the open end of the tube is slowed down to zero speed in the tube. The slowing down of the speed of the air tends to increase the pressure of the air. This increased pressure forms the total pressure Pt of the air flow.

In practice, the air flow may convey liquids or solid particles likely to penetrate into the Pitot tube and to build up in the tube at the blocked end. To avoid having a build-up of liquid disrupt the pressure measurement, there is generally provided, at the blocked end, a drain hole through which any liquids can be evacuated.

In this hole both the solid particles and a portion of the air which has entered into the Pitot tube also circulate. Thus, the slowing down of the air in the tube is not complete and the measurement of total pressure Pt is corrupted. More specifically, the greater the effort to avoid the build-up of large particles or of a quantity of liquid, the more the total pressure measurement is corrupted by increasing the dimensions of the drain hole. Conversely, the greater the effort to improve the measurement of total pressure Pt by reducing the dimensions of the drain hole, the greater the risk of build-up of solid particles or of congestion by the liquid. With a Pitot tube, there therefore has to be a trade-off between quality of the measurement of total pressure Pt and risk of disruption of the measurement because of particles conveyed by the air flow where the measurement is performed.

The measurement of the static pressure Ps is usually done by means of cavities that open into the flow through an orifice situated substantially at right angles to the flow. In the cavity, there is an orifice connected to a means for measuring the air pressure prevailing therein. This pressure forms the static pressure Ps of the flow. Some Pitot tubes can be equipped with static pressure taps positioned on their sides. This type of aerodynamic probe is also called Pitot-static probe.

Currently, if the drain holes of the probes installed on aircraft are blocked, or if particles of sand or of volcanic ash are present in the tube itself, the probe is removed, then cleaned with soapy water. The change of probe entails checking the seal-tightness of the pneumatic subsystem, which renders the operation relatively lengthy, of the order of thirty to fifty minutes for an aircraft.

SUMMARY OF THE INVENTION

The invention proposes a maintenance device that makes it possible to clean aerodynamic probes directly on the aircraft without the removal thereof, and without risk of damage to the connected pressure sensors by overpressure.

To this end, the subject of the invention is a device for maintaining and analyzing an aerodynamic probe of stagnation pressure type intended to be installed in an aircraft, characterized in that it comprises a channel with a first end that is intended to penetrate into the probe, means for creating in the channel an air depression relative to the ambient pressure and means for recovering any particles sucked into the channel.

BRIEF DESCRIPTION OF THE DRAWINGS

The invention will be better understood and other advantages will become apparent on reading the detailed description of an embodiment given as an example, the description being illustrated by the appended drawing in which.

In the interests of clarity, the same elements are given the same references in the different figures.

DETAILED DESCRIPTION

Figure 1:
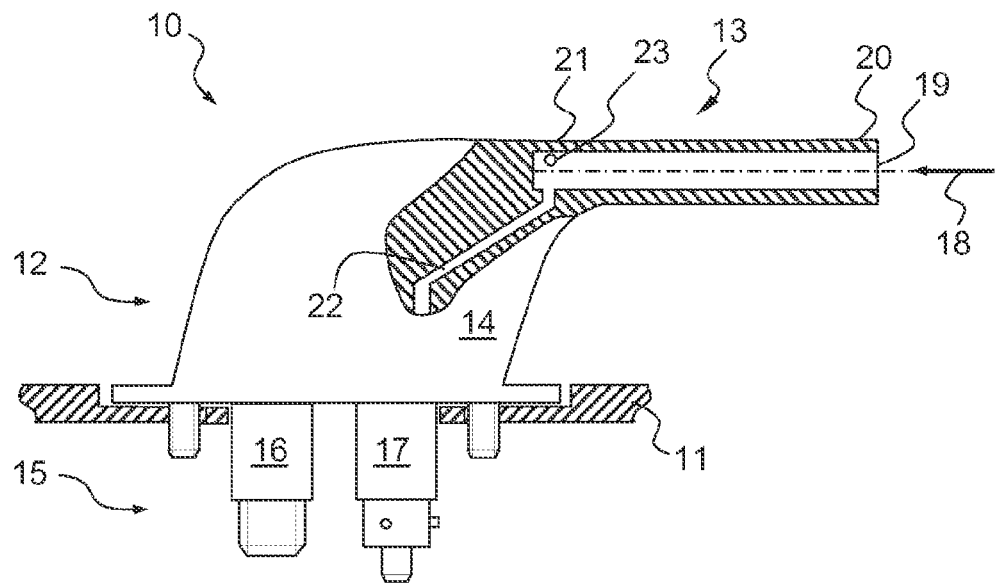
FIG. 1 represents an exemplary aerodynamic probe for which the invention can be implemented.

FIG. 1 represents a total pressure measurement probe 10 intended to be fixed through an opening produced in the skin 11 of an aircraft. The probe 10 comprises a part 12 external to the skin 11 and formed by a Pitot tube 13 borne by a mast 14. The probe 10 also comprises an internal part 15 essentially comprising an electrical connector 16 and a pneumatic connector 17 enabling the Pitot tube 13 to be pneumatically coupled to a pressure sensor situated inside the skin 11 of the aircraft. The probe 10 is positioned on the skin 11 of the aircraft so that the Pitot tube 13 is oriented substantially along a longitudinal axis of the aircraft, excluding boundary layer, so that the direction of the flow, represented by an arrow 18, substantially faces an inlet orifice 19 situated at a first end 20 of the Pitot tube 13.

A second end 21 of the Pitot tube 13, opposite the end 20, is closed so as to form a stopping point in the stream of air taken from the flow and penetrating into the Pitot tube 13 through its orifice 19. At the end 21 of the Pitot tube 13, a pneumatic channel 22 opens into the Pitot tube 13 to form a pressure tap there at which the air pressure is to be measured. The pneumatic channel 22 is, for example, linked to a pressure sensor or to another pressure measurement device. The pressure sensor makes it possible to effectively measure the pressure of the air prevailing inside the Pitot tube 13 at its end 21. The pressure sensor may belong to the probe 10 or even be sited elsewhere. In this case, the pressure sensor is coupled to the probe 10 by means of the pneumatic connector 17.

At the end 21, the Pitot tube 13 comprises one or more drain holes 23 making it possible to evacuate the liquid that is likely to penetrate into the Pitot tube 13. Apart from the drain hole(s) 23, the section of which is small compared to that of the Pitot tube 13, the latter being closed at its end 21, the pressure measured at this end therefore substantially represents the total pressure Pt of the air flow.

The electrical connector 16 makes it possible to electrically couple the probe 10 to the electrical network of the aircraft, notably to couple heating means for the probe 10 assembly. These heating means comprise, for example, a heating resistor, not represented in FIG. 1, and making it possible to heat up the mast 14 and the Pitot tube 13 over its entire length to avoid having any build-up of ice form on the probe.

In the example represented, the Pitot tube 13 is fixed relative to the skin 11 of the aircraft. It is obviously possible to mount the Pitot tube 13 on a movable mast such as a paddle that can be oriented in the axis of the flow, for example as described in the patent published under the number FR 2 665 539 and filed Aug. 3, 1990. Thus, when the local angle of attack of the flow in the vicinity of the probe 10 changes, the orientation of the Pitot tube 13 follows this angle of attack in order to be always facing the flow. The measurement of total pressure Pt is thereby enhanced in the event of variation of local angle of attack It is also possible to complement the measurement of total pressure with a measurement of static pressure. To this end, it is possible to position one or more static pressure taps on an outer face of the Pitot tube 13 and to couple these pressure taps to pressure sensors by means of channels passing through the pneumatic connector 17.

At the end 21, the Pitot tube 13 generally comprises a water trap, not represented, that makes it possible to block the liquid likely to penetrate into the Pitot tube 13, and evacuate it through the associated drain hole. This water trap makes it possible to avoid having the ingested liquid penetrate into the channel 22. In the normal operation of the tube, the thus trapped water is evacuated from the Pitot tube 13 through the drain holes 23. When the aircraft is flying, solid particles, such as sand or volcanic ash, can also penetrate into the Pitot tube 13. These particles also build up at the bottom of the tube, at the end 21, and notably in the water trap. These particles may not be able to be evacuated through the drain holes 23 and may block them or stagnate in the water trap.

Figure 2:
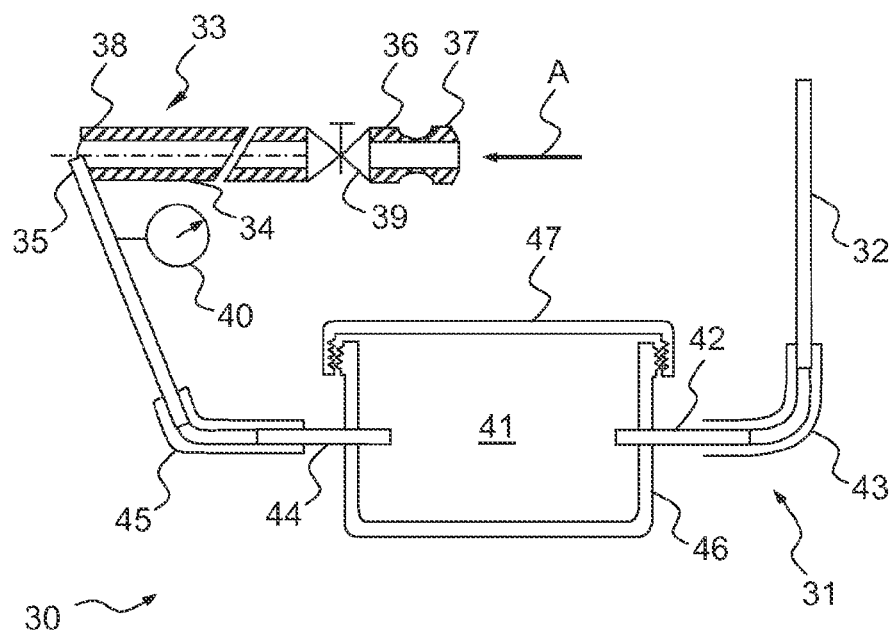
FIG. 2 represents an exemplary maintenance device according to the invention.

FIG. 2 represents an example of a maintenance device 30 that makes it possible to clean the probe 10 of its particles without requiring it to be removed.

The maintenance device 30 comprises a channel 31 with a first end 32 that is intended to penetrate into the probe 10 to suck up any particles located therein. The end 32 is, for example, made of flexible material, such as, for example, a plastic material, so as not to damage the interior of the probe.

The maintenance device 30 is external to the probe 10. It is implemented by maintenance personnel during aircraft stopovers. The maintenance device 30 is a tool which is not used in flight. More specifically, maintenance personnel, provided with the device 30, go to a probe 10, fits the first end 32 into the probe to perform a suction operation there, then remove the first end 32.

The maintenance device 30 also comprises means 33 for creating in the channel 31 an air depression relative to the ambient pressure. It is important for this to be a depression, in order to avoid the overpressures that could damage the associated pressure sensor. This depression can be created by means of a pump actuated by an electric motor. Nevertheless, during aircraft stopovers, it is sometimes difficult to find an electrical power source in the vicinity of the aircraft parking points. It is easier to find a compressed air source made available to the ground teams for aircraft maintenance. This compressed air source, or more generally a pressurized inert gas source, is advantageously implemented to generate the air depression in the channel 31. To this end, the means 33 comprise an ejector 34 intended to be coupled to a pressurized gas source and ejecting the gas in proximity to a second end 35 of the channel 31 in order to drive the air present in the channel 31. The gas ejection speed at the output of the ejector 34 sucks the air contained in the channel 31.

The ejector 34 is formed by a tube coupled at a first of its ends 36 to the pressurized gas source. To this end, the ejector 34 can be provided with a quick-release pneumatic connector 37. The ejector 34 is open on the outside at its second end 38 thus creating a circulation of the gas in the ejector 34. The direction of this circulation is shown by an arrow A. A valve 39 can be put in place in the ejector 34 downstream of the pneumatic connector 37 to allow an operator to control the circulation of the gas in the ejector 34 as required. The valve 39 can operate in on or off mode in order to allow or prevent the circulation of gas in the ejector 34 or even in proportional mode in order to control the speed of the gas in the ejector 34. A pressure sensor 40 can be provided in the channel 31 in order to know the value of the depression in the channel 31. More generally, the maintenance device 30 comprises means for measuring and displaying the depression prevailing in the channel 31. An operator can regulate this depression by acting on the valve 39.

The maintenance device 30 also comprises means for recovering any particles sucked into the channel 31. These means advantageously comprise a closed vessel 41 positioned in the line of the channel 31 between these two ends 32 and 35. More specifically, the channel 31 comprises a first end-fitting forming the end 32 and a second end-fitting 42 opening into the vessel 41. The two end-fittings 32 and 42 are positioned upstream of the vessel 41 in the direction of circulation of the air sucked into the channel 31. The end-fittings 32 and 42 can be coupled by means of a joint 43 that is more flexible than the two end-fittings 32 and 42 themselves. This makes it easier to handle the maintenance device 30 and notably the entry of the end-fitting 32 into the Pitot tube 13. It is obviously possible to produce the two end-fittings 32 and 42 in a single tube. Furthermore, the channel 31 comprises a third end-fitting forming the end 35 and a fourth end-fitting 44 opening into the vessel 41. The two end-fittings 35 and 44 are positioned downstream of the vessel 41. As previously, the end-fittings 35 and 44 can be coupled by means of a joint 45. The end fittings 42 and 45 open into the vessel 41 at a distance from one another so that the speed of the air in the vessel is very much lower than that of the air that is circulating in the channel 31. This speed difference allows any particles circulating in the end-fittings 32 and 42 to be deposited in the bottom of the vessel 41 without continuing their way into the end-fittings 35 and 44 situated downstream of the vessel 41.

Advantageously, the vessel 41 comprises at least one transparent wall 46 enabling the operator to view the particles present in the vessel 41.

Advantageously, the vessel 41 comprises a removable wall 47 making it possible to remove the trapped particles from the vessel 41. The recovered particles can be simply discarded or analyzed to determine their nature. The removable wall 47 may be formed by a cover that can be screwed onto a body of the vessel 41, forming the wall 46. The cover 47 and the end-fittings 42 and 44 are coupled to the vessel 41 in a sufficiently tight manner to be able to retain a substantially constant depression all along the channel 31.

Figures 3A, 3B:
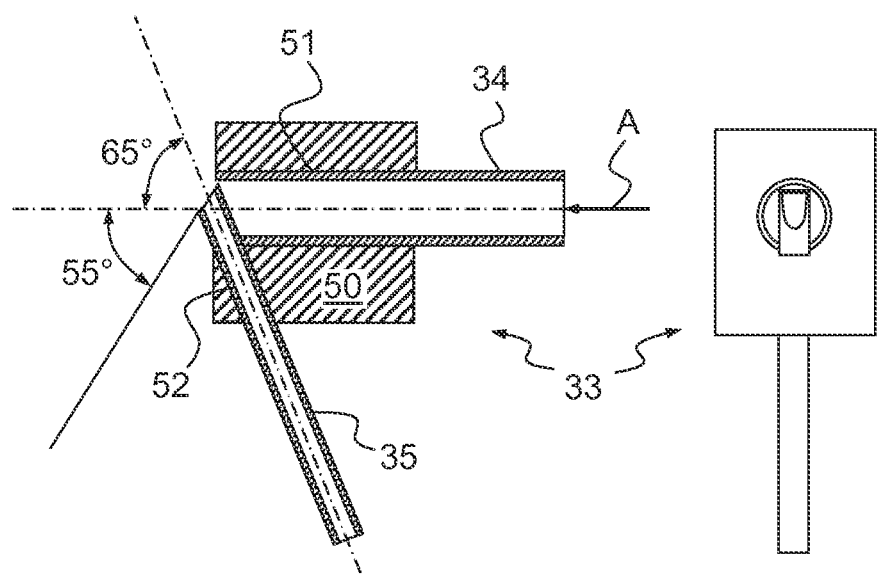
FIGS. 3a and 3b represent, in more detail, a part of the maintenance device represented in FIG. 2.

FIGS. 3a and 3b represent an exemplary embodiment of the means 33 for creating in the channel 31 an air depression and notably the relative positioning of the ejector 34 and of the end-fitting 35. The ejector 34 is formed by a rectilinear tube of 6 mm internal diameter and 7 mm external diameter. The end-fitting 35 is formed by a rectilinear tube of 2 mm internal diameter and 3 mm external diameter. A block 50 makes it possible to fix the relative position of the end-fitting 35 relative to the ejector 34. The block 50 is pierced with two through holes 51 and 52, making it possible to each receive one of the two tubes respectively forming the ejector 34 and the end-fitting 35. The two elements 43 and 35 are fitted into the block 50 and, for example, fixed by gluing, hard-soldering or welding in the corresponding holes 51 and 52.

FIG. 3a is a front view of the means 33 for creating in the channel 31 an air depression and FIG. 3b is a cross-sectional view in a plane at right angles to that of FIG. 3a. The two holes 51 and 52 intersect and the respective axes extend in the plane of FIG. 3b. In the example represented, the two axes form an angle of approximately 65° between them. Furthermore, the end of the end-fitting 35 is beveled to approximately 55° relative to the axis of the end-fitting 35 and opens into the ejector 34. The gases expelled by the ejector 35 circulate by surrounding the opening of the end-fitting 35 and create a depression therein.

The invention claimed is:

1. A device for maintaining and analyzing an aerodynamic probe of stagnation pressure type for installation in an aircraft, the device comprising: a channel with a first end that is configured to penetrate into the probe, an ejector fluidly coupled to the channel to create an air depression in said channel relative to the ambient pressure and a closed vessel recovering any particles sucked into the channel, the ejector and closed vessel being external to the probe when the channel is inserted into the probe.

2. The device as claimed in claim 1, wherein the ejector is coupled to a pressurized gas source and ejects gas in proximity to a second end of the channel opposite the first end to suction the air present in the channel and thereby create the air depression in said channel.

3. The device as claimed in claim 2, wherein the closed vessel is positioned in the line of the channel.

4. The device as claimed in claim 2, further comprising a sensor measuring and displaying the depression prevailing in the channel.

5. The device as claimed in claim 2, wherein the channel, at the first end, is formed from a flexible material.

6. The device as claimed in claim 1, wherein the closed vessel is positioned in the line of the channel.

7. The device as claimed in claim 6, wherein the closed vessel comprises at least one transparent wall.

8. The device as claimed in claim 7, wherein the closed vessel comprises a removable wall.

9. The device as claimed in claim 6, wherein the closed vessel comprises a removable wall.

10. The device as claimed in claim 1, further comprising a sensor measuring and displaying the depression prevailing in the channel.

11. The device as claimed in claim 1, wherein the channel, at the first end, is formed from a flexible material.

* * * * *